US010108976B2

United States Patent
Burke

(10) Patent No.: US 10,108,976 B2
(45) Date of Patent: Oct. 23, 2018

(54) SYSTEM AND METHOD FOR MARKETING SPONSORED ENERGY SERVICES

(71) Applicant: Ambit Holdings, L.L.C., Dallas, TX (US)

(72) Inventor: John Burke, Dallas, TX (US)

(73) Assignee: BLUENET HOLDINGS, LLC, Dallas, TX (US)

( * ) Notice: Subject to any disclaimer, the term of this patent is extended or adjusted under 35 U.S.C. 154(b) by 494 days.

(21) Appl. No.: 14/038,019

(22) Filed: Sep. 26, 2013

(65) Prior Publication Data

US 2014/0025475 A1    Jan. 23, 2014

Related U.S. Application Data

(63) Continuation-in-part of application No. 13/892,706, filed on May 13, 2013, which is a continuation-in-part (Continued)

(51) Int. Cl.
| | |
|---|---|
| *G06Q 30/02* | (2012.01) |
| *G06Q 50/06* | (2012.01) |
| *G06Q 20/10* | (2012.01) |

(52) U.S. Cl.
CPC ....... *G06Q 30/0237* (2013.01); *G06Q 20/102* (2013.01); *G06Q 30/02* (2013.01); *G06Q 50/06* (2013.01); *Y04S 50/00* (2013.01)

(58) Field of Classification Search
None
See application file for complete search history.

(56) References Cited

U.S. PATENT DOCUMENTS

| 3,231,670 A | 1/1966 | Lane et al. |
| 4,509,128 A | 4/1985 | Coppola et al. |
| (Continued) | | |

FOREIGN PATENT DOCUMENTS

| WO | 0150313 A1 | 7/2001 |
| WO | 0165823 A1 | 9/2001 |
| (Continued) | | |

OTHER PUBLICATIONS

Texas SET 814 25: Move Out Response dated Jun. 25, 2007.
(Continued)

*Primary Examiner* — James M Detweiler
(74) *Attorney, Agent, or Firm* — Schultz & Associates, P.C.

(57) ABSTRACT

Systems and methods are disclosed for a retail energy marketing system including a server interacting with a remote display device, a sponsor, an energy market organization, and a set of financial services companies. The server executes an application for servicing customers while interacting with the remote display device and a sponsor application for sponsors to set up advertising and incentives for the retail energy marketing system. The server also executes a database, an ESI ID lookup application for validating customer eligibility for services and an accounting application for EMO energy usage transactions, EMO invoice transactions, customer bills, customer payments, treatment operations, customer incentives and sponsor commissions. A remote display device is placed at a retail location where customers can sign-up for energy services, view and print their billing and payment histories, and pay their bills. In return for using the remote display device, customers may receive incentives from the sponsor.

13 Claims, 6 Drawing Sheets

Related U.S. Application Data of application No. 11/899,197, filed on Sep. 4, 2007, now Pat. No. 8,442,917.

(56) References Cited

U.S. PATENT DOCUMENTS

| | | | |
|---|---|---|---|
| 5,943,656 | A | 8/1999 | Crooks et al. |
| 6,018,726 | A | 1/2000 | Tsumura |
| 6,088,688 | A | 7/2000 | Crooks et al. |
| 6,240,167 | B1 | 5/2001 | Michaels |
| 6,343,277 | B1 | 1/2002 | Gaus |
| 6,366,889 | B1 | 4/2002 | Zaloom |
| 6,618,709 | B1* | 9/2003 | Sneeringer ......... G06Q 30/0283 705/400 |
| 7,043,459 | B2 | 5/2006 | Peevey et al. |
| 7,062,453 | B1* | 6/2006 | Clarke ................ G06Q 30/06 705/26.3 |
| 7,117,172 | B1 | 10/2006 | Black |
| 7,149,707 | B2 | 12/2006 | Scoble |
| 7,233,843 | B2 | 6/2007 | Budhraja et al. |
| 2002/0120519 | A1 | 8/2002 | Martin et al. |
| 2003/0009401 | A1 | 1/2003 | Ellis |
| 2003/0040927 | A1* | 2/2003 | Sato ..................... G06Q 20/20 705/1.1 |
| 2003/0046252 | A1 | 3/2003 | Spool et al. |
| 2003/0149603 | A1 | 8/2003 | Ferguson |
| 2003/0182187 | A1 | 9/2003 | Scoble |
| 2004/0093200 | A1 | 5/2004 | Scott |
| 2004/0133514 | A1* | 7/2004 | Zielke ................ G06Q 20/10 705/40 |
| 2004/0143464 | A1 | 7/2004 | Houle |
| 2004/0179672 | A1 | 9/2004 | Pagel et al. |
| 2005/0187888 | A1 | 8/2005 | Sherman et al. |
| 2005/0192897 | A1 | 9/2005 | Rogers et al. |
| 2006/0001414 | A1 | 1/2006 | Angerame et al. |
| 2006/0026017 | A1 | 2/2006 | Walker |
| 2006/0036501 | A1* | 2/2006 | Shahbazi ............ G06Q 20/10 705/16 |
| 2006/0038004 | A1* | 2/2006 | Rielly ............. G06Q 20/1085 235/379 |
| 2006/0161450 | A1 | 7/2006 | Carey et al. |
| 2006/0173779 | A1* | 8/2006 | Bennett .............. G06Q 20/10 705/40 |
| 2006/0206425 | A1 | 9/2006 | Sharma |
| 2006/0256951 | A1 | 11/2006 | Rodenbusch et al. |
| 2007/0112579 | A1 | 5/2007 | Ratnakaran et al. |
| 2007/0250384 | A1* | 10/2007 | Geller ............... G06Q 30/0256 705/14.54 |
| 2007/0260562 | A1 | 11/2007 | Hutson et al. |
| 2008/0091626 | A1 | 4/2008 | Kremen |
| 2008/0319777 | A1 | 12/2008 | Hoff |
| 2009/0276289 | A1 | 11/2009 | Dickenson |
| 2009/0307074 | A1 | 12/2009 | Sharma |
| 2010/0114677 | A1* | 5/2010 | Carlson ................ G06Q 30/02 705/14.1 |
| 2010/0268792 | A1* | 10/2010 | Butler .................. G06Q 30/02 709/217 |
| 2011/0161151 | A1* | 6/2011 | Brodie ................. G06Q 30/02 705/14.25 |
| 2011/0264291 | A1 | 10/2011 | Le Roux |
| 2012/0095841 | A1 | 4/2012 | Luckerman |
| 2012/0136780 | A1* | 5/2012 | El-Awady ............ G06Q 20/102 705/40 |
| 2014/0067461 | A1 | 3/2014 | Zhang |
| 2014/0200930 | A1 | 7/2014 | Zizzamia |

FOREIGN PATENT DOCUMENTS

| | | |
|---|---|---|
| WO | 0177973 A2 | 10/2001 |
| WO | 2006119185 A2 | 11/2006 |

OTHER PUBLICATIONS

Texas SET 814 26: Ad-Hoc Historical Usage Request dated Jun. 25, 2007.
Texas SET 814 27: Ad-Hoc Historical Usage Response dated Jun. 25, 2007.
Texas SET 814 28: Complete Unexecutable or Permit Required dated Jun. 25, 2007.
Texas SET 814 29: Response to Complete Unexecutable or Permit Required dated Jun. 25, 2007.
Texas SET 814 PC: Maintain Customer Information Request dated Jun. 25, 2007.
Texas SET 814 PD: Maintain Customer Information Response dated Jun. 25, 2007.
Texas SET 820 02: Remittance Advice dated Jun. 25, 2007.
Texas SET 820 03: Muni/ Co-op Remittance Advice dated Jun. 25, 2007.
Texas SET 824: Application Advice dated Jun. 25, 2007.
Texas SET 867 02: Historical Usage dated Jun. 25, 2007.
Texas SET 867 03: Monthly Usage dated Jun. 25, 2007.
Texas SET 867 04: Initial Meter Read Notification dated Jun. 25, 2007.
Texas SET 997: Functional Acknowledgement dated Jun. 25, 2007.
Texas SET Change Request Form: Change Control #2004-674 dated Dec. 8, 2004.
Texas SET Change Request Form: Change Control #2004-678 dated Dec. 3, 2004.
Texas SET Change Request Form: Change Control #2005-687 dated Mar. 9, 2005.
Texas SET Change Request Form: Change Control #2006-691 dated Jun. 6, 2006.
Texas SET Change Request Form: Change Control #2006-697 dated Jul. 17, 2007.
Texas SET Change Request Form: Change Control #2006-698 dated Jun. 19, 2006.
Texas SET Change Request Form: Change Control #2006-699 dated Jul. 3, 2006.
Texas SET Change Request Form: Change Control #2006-700 dated Aug. 23, 2006.
Texas SET Change Request Form: Change Control #2006-701 dated Aug. 22, 2006.
Texas SET Change Request Form: Change Control #2006-702 dated Aug. 23, 2006.
Texas SET Change Request Form: Change Control #2006-703 dated Aug. 24, 2006.
Texas SET Change Request Form: Change Control #2007-704 dated Jan. 31, 2007.
Texas SET Change Request Form: Change Control #2006-708 dated Jun. 5, 2007.
Texas SET Change Request Form: Change Control #2007-712 dated Jul. 9, 2007.
Texas SET 814 07: Drop Due to Switch Response dated Jun. 25, 2007.
Texas SET 814 08: Cancel Switch Request dated Jun. 25, 2007.
Texas SET 814 09: Cancel Switch Response dated Jun. 25, 2007.
Texas SET 814 10: Drop to AREP Request dated Jun. 25, 2007.
Texas SET 814 11: Drop Response dated Jun. 25, 2007.
Texas SET 814 12: Date Change Request dated Jun. 25, 2007.
Texas SET 814 13: Date Change Response dated Jun. 25, 2007.
Texas SET 814 14: Drop Enrollment Request dated Jun. 25, 2007.
Texas SET 814 15: Drop Enrollment Response dated Jun. 25, 2007.
Texas SET 814 16: Move in Request dated Jun. 25, 2007.
Texas SET 814 17: Move in Reject Response dated Jun. 25, 2007.
Texas SET 814 18: Establish/Delete Continuous Service Agreement (CSA) Request dated Jun. 25, 2007.
Texas SET 814 19: Establish/Delete Continuous Service Agreement (CSA) Response dated Jun. 25, 2007.
Texas SET 814 20: Create/Maintain/Retire ESI ID Request dated Jun. 25, 2007.
Texas SET 814 21: Create/Maintain/Retire ESI ID Response dated Jun. 25, 2007.
Texas SET 814 22: Continuous Service Agreement (CSA) CR Move In Request dated Jun. 25, 2007.

(56) References Cited

OTHER PUBLICATIONS

Texas SET 814 23: Continuous Service Agreement (CSA) CR Move In Response dated Jun. 25, 2007.
Texas SET 814 24: Move Out Request dated Jun. 25, 2007.
Texas SET Swimlanes Notification of Suspension Scenarios dated Apr. 12, 2005.
Texas SET Swimlanes Unplanned Outage Scenarios dated Apr. 12, 2005.
Texas SET Swimlanes MIMO Cancellation Scenarios dated Apr. 12, 2005.
Texas SET Swimlanes MIMO Cancellation Scenarios dated Feb. 13, 2007.
Texas SET Swimlanes MIMO Concurrent Processing Scenarios dated Apr. 12, 2005.
Texas SET Swimlanes Move In dated Dec. 8, 2008.
Texas SET 650 01: Service Order Request dated Jun. 25, 2007.
Texas SET 650 02: Service Order Complete, Complete Unexecutable, Reject Response or Notification of Permit Required dated Jun. 25, 2007.
Texas SET 650 04: Suspension of Delivery Service Notification or Cancellation dated Jun. 25, 2007.
Texas SET 650 05: Suspension of Delivery Service Reject Response dated Jun. 25, 2007.
Texas SET 810 02: TDSP to CR Invoice dated Jun. 25, 2007.
Texas SET 810 03: Muni / Co-op Invoice dated Jun. 25, 2007.
Texas SET 814 01: Enrollment Request dated Jun. 25, 2007.
Texas SET 814 02: Enrollment Reject Response dated Jun. 25, 2007.
Texas SET 814 03: Switch CR Notification Request dated Jun. 25, 2007.
Texas SET 814 04: Switch CR Notification Response dated Jun. 25, 2007.
Texas SET 814 05: Premise Information and Enrollment Response dated Jun. 25, 2007.
Texas SET 814 06: Drop Due to Switch Request dated Jun. 25, 2007.
"Oracle Advanced Collections User Guide", Release 11, Part No. B19161-02, Oct. 2005, 148 pages, Oracle Corporation.
ERCOT Protocols—Sep. 1, 2007, published by the Electric Reliability Council of Texas, 848 pages.
ERCOT Protocols Retail Market Guide, Jun. 25, 2007, Electric Reliability Council of Texas, 187 pages.
Texas SET Swimlanes Customer Switch Scenarios dated Apr. 12, 2005.
Texas SET Swimlanes Customer Move Out Scenarios dated Apr. 12, 2005.
Texas SET Swimlanes Billing Scenarios dated Feb. 13, 2007.
Texas SET Swimlanes Customer Move in Scenarios dated Apr. 12, 2005.
Texas SET Swimlanes CSA Scenarios dated Apr. 12, 2005.
Texas SET Swimlanes Provider of Last Resort Scenarios dated Apr. 12, 2005.
Texas SET Swimlanes Establish Maintain ESI Scenarios dated Apr. 20, 2005.
Texas SET Swimlanes AD Hoc Historical Usage Scenarios dated Apr. 12, 2005.
Texas SET Swimlanes H1 Maintain Customer Information dated Apr. 12, 2005.
Texas SET Swimlanes Service Order Scenarios dated Apr. 12, 2005.
Texas SET Swimlanes Billing Scenarios dated Apr. 12, 2005.
Texas SET 650 02: Service Order Complete, Complete Unexecutable, Reject Response or Notification of Permit Required.
Texas SET 650 04: Suspension of Delivery Service Notification or Cancellation.
Texas SET 810 02: TDSP to CR Invoice.
Texas SET 814 PC: Maintain Customer Information Request.
Texas SET 820 02: Remittance Advice.
Texas SET 867 03: Monthly Usage.
Texas SET Change Request Form: Change Control #2006-692 dated Jun. 7, 2006.
Texas SET 814 15: Affiliated Retail Electric Provider (AREP) Drop Enrollment Response.
Texas SET 814 19: Establish/Delete Continuous Service Agreement (CSA) Response.
Texas SET 814 25: Move Out Response.
Texas SET 814 27: Ad-Hoc Historical Usage Response.
Texas SET 814 28: Complete Unexecutable or Permit Required.
Texas SET Change Request Form: Change Control #2006-693 dated Jul. 3, 2006.
Texas SET Change Request Form: Change Control #2006-694 dated Jul. 10, 2006.
Texas SET Change Request Form: Change Control #2006-696 dated Jul. 17, 2006.
Texas SET 814 04: Switch CR Notification Response.
Texas SET 814 08: Cancel Switch Request.
Texas SET 814 14: Affiliated Retail Electric Provider (AREP) Drop Enrollment Request.
Ambit Energy Alteryx User cases (Sep. 9, 2015, 22 pages, retrieved from http://www.slideshare.net/Alteryx/ambit-energy-alteryxusercases).
Business Intelligence: A Design Science Perspective, Salvatore T. March, David K Wilson Professor of Management, Owen Graduate School of Management, Vanderbilt University, Apr. 21, 2010, 93 pages.

* cited by examiner

EMO interactions with system

Sponsor interactions with system

Consultant interactions with system

SYSTEM AND METHOD FOR MARKETING SPONSORED ENERGY SERVICES

CROSS REFERENCE TO RELATED APPLICATIONS

This is a continuation-in-part of U.S. patent application Ser. No. 13/892,706 filed May 13, 2013, which is a continuation-in-part of application Ser. No. 11/899,197 filed Sep. 4, 2007, now U.S. Pat. No. 8,442,917. Each patent application identified above is incorporated here by reference in its entirety to provide continuity of disclosure.

FIELD OF INVENTION

The present invention relates generally to systems for reconciling and forecasting wholesale energy usage for an energy provider.

BACKGROUND OF THE INVENTION

In the 1990s, utilities and federal and state regulators began forming independent system operators (ISOs) and regional transmission organizations (RTOs) as transmission and generation of electricity was deregulated. The ISO and/or RTO (hereafter Energy Market Operator, EMO) coordinate generation and transmission of electric power across wide geographic regions, matching power generation to load instantaneously to balance the supply of and demand for electricity. These organizations forecast load and schedule generation to assure sufficient capacity and back-up power in case demand rises, a power-plant goes offline or a power line is lost. The primary role of the EMO is to ensure equal access to the power grid for non-utility firms, enhance the reliability of the transmission system and operate wholesale electricity markets. The markets control payment and settlement between wholesale producers, marketers, transmission and distribution service providers (TDSP), owners and buyers including other EMOs.

TDSP entities are generally responsible for the transmission and distribution of energy through power lines that they maintain and typically own. The TDSP entities typically also own the metering devices attached to residential and commercial customer's facility, servicing the meters and reading them periodically.

A Public Utilities Commission (PUC) regulates the delivery of electricity including reliability and safety, rates and terms, setting the operating standards for the TDSPs. The PUC typically oversees the regional EMO market, for example by reviewing proposals for new transmission facilities or generators. The PUC enforces rules and regulations for retail competition, including customer protections, pricing rules and the implementation of energy goals. The PUC also regulates licensing and rules enforcement.

An example of an EMO is the Energy Reliability Council of Texas (ERCOT) which manages the Texas power grid, an example of a TDSP is TXU Energy Delivery; an example of a PUC is the Texas Public Utilities Commission.

The operation of a wholesale deregulated electricity market by the EMO enables local retail electricity providers (REPs) to buy and sell electricity. The market supplies the REPs with a means for meeting consumer needs for power at the lowest possible costs. An example of a REP is Ambit Energy, Inc. of Dallas, Tex.

U.S. Pat. No. 6,618,709 to Sneeringer discloses a method and architecture for web-based monitoring of energy-related usage for energy clients is disclosed. Sneeringer teaches recording resource usage measured by a resource meter on a resource metering data recorder and then, polling the resource metering data recorder and storing the resource usage in a searchable database. An energy customer is allowed to access the resource metering data via a web interface.

Martin et al., in U.S. Patent Publication No. 2002/0120519, disclose collecting energy customer data from a group of energy customers. Martin further discloses a process of individually evaluating and generating a load profile of consumers of utility services based on their historical usage information. A provider may define or select an aggregated group of consumers based on a consumer's individual profile, then bid to provide services to the aggregated group of customers.

Spool et al., in U.S. Patent Publication No. 2003/0046252, disclose a load profile estimator based on using historical meter data where aggregate load profile estimates can employ load models based on historical meter and weather data including near term meter data and current calendar day as inputs.

Therefore, there is a need for a system incentivizing a customer for using managed energy services while the customer is in a retail environment.

There is also a need for a system in which a REP provides remotely managed advertisements in a retail store environment to energy customers. Further, there is a need to enable retail customers to pay energy bills and manage energy accounts in a convenient public location.

SUMMARY

Systems and methods are disclosed for a retail energy marketing system including a server interacting with a remote display device, a sponsor, an energy market organization, and a set of financial services companies. The server executes a remote display device application for servicing customers while interacting with the remote display device and a sponsor application for sponsors to set up advertising and incentives for the retail energy marketing system. The server also executes a database, an ESI ID lookup application for validating a customer eligibility for services and an accounting application for accounting for EMO energy usage transactions, EMO invoice transactions, customer bills, customer payments and treatment operations, customer incentives and sponsor commissions. A remote display device is placed at a retail location where customers can apply for energy services, view and print billing payment histories, and pay bills. In return for using the remote display device, customers view advertisements and may receive immediate incentives from the sponsor.

BRIEF DESCRIPTION OF DRAWINGS

The disclosure will be provided with reference to the accompanying drawings.

DETAILED DESCRIPTION OF PREFERRED EMBODIMENTS

Figure 1:
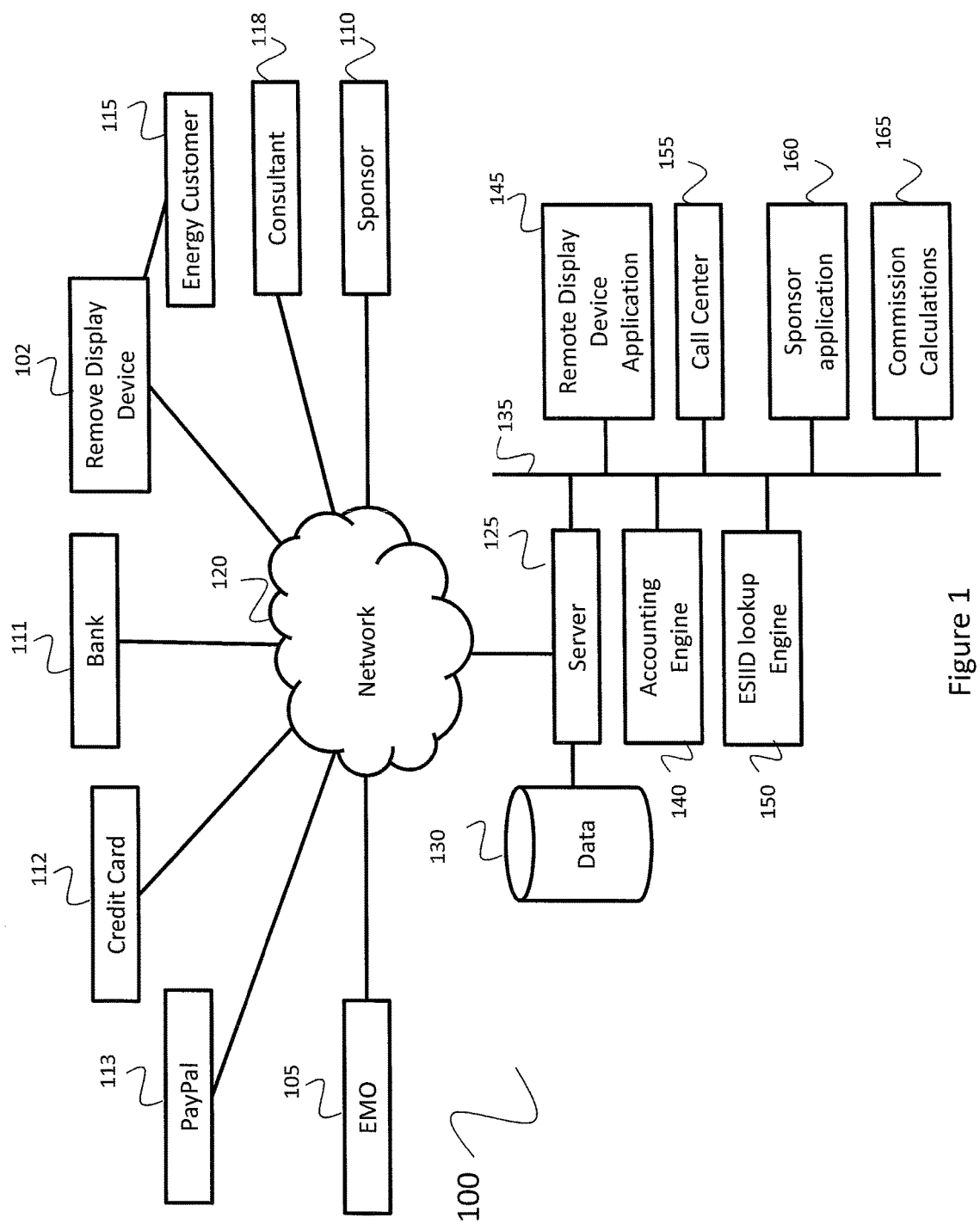
FIG. 1 is a block diagram of a preferred embodiment of a remote display device based marketing system for energy services delivered by an energy provider and sponsored by a sponsor.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. The propagated data signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, or any suitable combination thereof.

Computer program code for carrying out operations for aspects of the present disclosure may be written in any combination of one or more programming languages, including an object oriented programming language such as Java, C++, C#, .NET, Objective C, Ruby, Python SQL, or other modern and commercially available programming languages.

Aspects of the present disclosure are described with reference to flowchart illustrations and/or block diagrams of methods, systems and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring to FIG. 1, system 100 for marketing and performing retail energy services is described.

A server 125 operated by an energy provider is connected by a network 120 to an energy market operator (EMO) 105, remote display device 102 placed at a retail location and operated by a sponsor 110, a consultant 118, and a set of financial institutions including a bank 111, a credit card firm 112 and payment processing firm 113 such as PayPal. Remote display device 102 is described in more detail below.

A set of energy customers 115 receive energy through a transmission and distribution system including a set of energy meters installed at the energy customer's premises to measure consumption of energy, for example, gas or electricity. The set of energy customers 115 interact the energy provider using remote display device 102.

Server 125 comprises a set of processors and a set of instructions in a memory that implement an accounting engine 140, a remote display device application 145, a sponsor application 160, an ESI ID lookup engine 150, a commission calculation engine 165 and a call center 155 connected by an internal network 135. Server 125 further comprises a database 130 to manage customer related data and energy usage data. For example, database 130 stores and accesses a set of customer data records including a set of records for energy customer 115. The set of customer data records includes a customer address, meter identifier, monthly energy usages, invoice transactions, customer scale factors and a customer profile.

Server 125 accepts incoming energy related transactions from EMO 105 and stores them in database 130. Server 125 also sends outgoing energy related transactions from database 130 to EMO 105. The monthly energy usages are received from EMO 105 as a set of usage transactions and a corresponding set of invoice transactions. Each monthly energy usage is a set of energy readings measured at a customer energy meter as collected by a TDSP and processed by the EMO.

In a preferred embodiment, consultant 118 and sponsor 110 may also be a customer of energy services from the energy provider, for example, for the retail location. Consultant 118 interacts with energy customer 115 to enable use of energy services through the energy provider. Sponsor 110 participates in a joint marketing effort with the energy provider. Sponsor also interacts with sponsor application 160 to submit advertisements and incentives for display at the remote display device. Remote display device application 145 interacts with sponsor application to distribute advertisements and incentives.

In another embodiment, consultant 118 is also a sponsor. In this situation, the consultant may sponsor remote display devices in various retail locations displaying advertisements related to the consultant.

Accounting engine 140 includes a set of programmed instructions that accounts for incoming energy usage transactions, invoice transactions and accounts for payments received from the energy customer. The accounting engine also rates the energy usage to create bills.

Commission calculation engine 165 includes a set of programmed instructions that calculates commissions for the sponsor and for the consultant, based on payments received from the energy customer.

Figure 2:
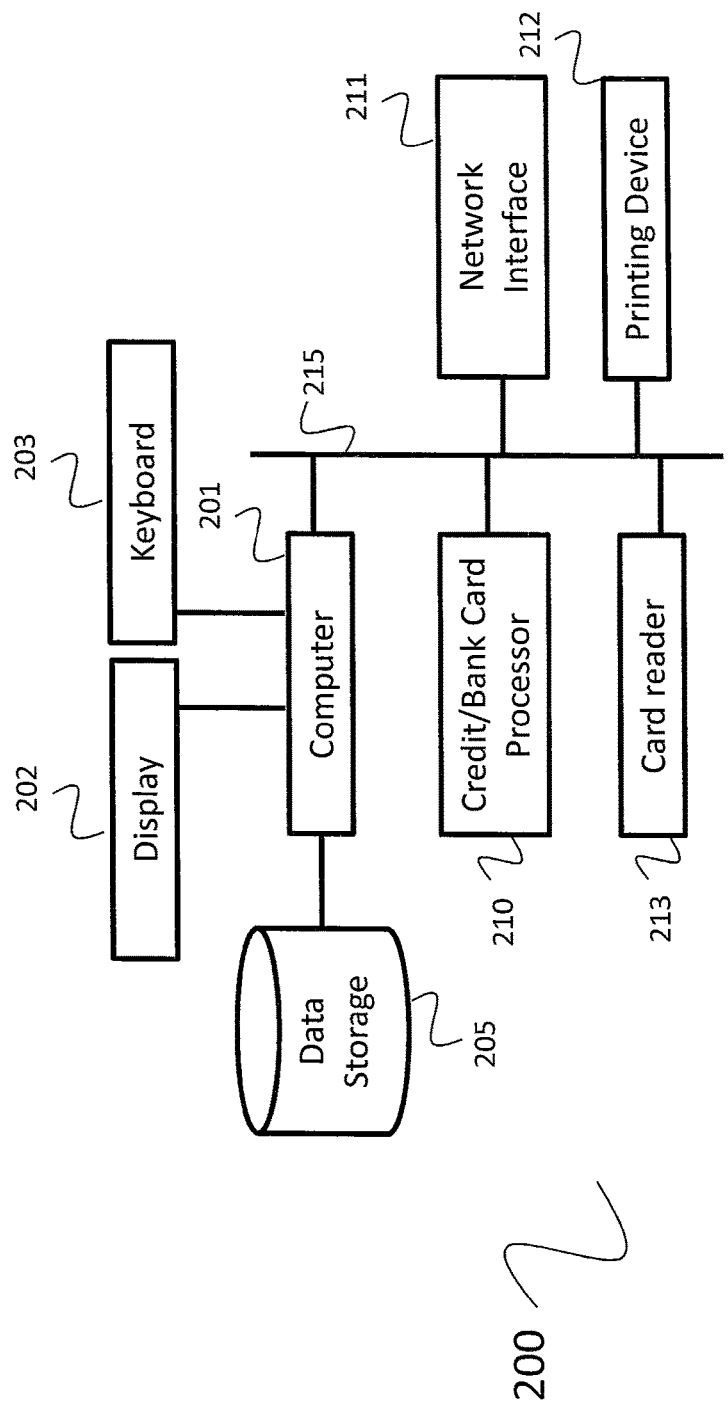
FIG. 2 is a block diagram of a preferred embodiment of a remote display device system for energy services.

Referring to FIG. 2, in a preferred embodiment, the remote display device is a stand-alone workstation 200 including a computer 201 connected to a display 202, a keyboard 203, a data storage device 205 and an internal network 215. In another preferred embodiment, the workstation is housed in a stand-alone retail kiosk display. The computer is further connected by internal network 215 to a credit card/bank card processor 210, a printing device 212, a card reader 213 and a network interface 211. In other preferred embodiments, the keyboard, card processor, printing device and card reader may be omitted. Other data input and display devices may also be substituted.

Computer 201 includes a set of programmed instructions that communicates with the Internet through network interface 211 to the remote display device application server. In a preferred embodiment, network interface 211 may be a wired Ethernet interface connected to the Internet through a router placed at the retail location. In an alternate embodiment, network interface 211 may be a wireless Ethernet interface connected to the Internet through a wireless radio service, such as a cell phone service.

Computer 201 includes a set of programmed instructions that communicates with the credit card/bank card processor 210 through internal network 215 and with the set of financial institutions through network interface 211. Credit card/bank card processor 210 includes a card reader 213 to automatically read data from credit cards and bank debit cards including account information. The credit card/bank card processor 210 is configured to create monetary transactions, and transmit/receive monetary related transactions to/from the set of financial institutions. For example, credit card/bank card processor 210 performs normal credit card related transactions, such as, data acquisition, creating a payment transaction, transmitting the payment transaction, obtaining approval to debit the credit card account and receiving confirmation of the debit. Display 202, keyboard 203 and card reader 213 are utilized by credit card/bank card processor 210 to interact with a customer to effect transactions.

Computer 201 includes another set of programmed instructions that communicate with the printing device for printing payment receipts, printing usage history reports, printing payment history reports, printing copies of bills and printing coupons as incentives. The coupons, for example, may be for in-store purchase incentives. Also, printing device 212 can be configured to print retail gift cards for in-store and online use.

In an alternate embodiment, the remote display device is a mobile device, such as a smart phone, operating a mobile application. Coupons are digitally displayed for in-store purchases. Copies of payment receipts, usage history reports, payment history reports, bills and coupons are downloaded into storage of the smart mobile device which can be accessed for printing.

Figure 3:
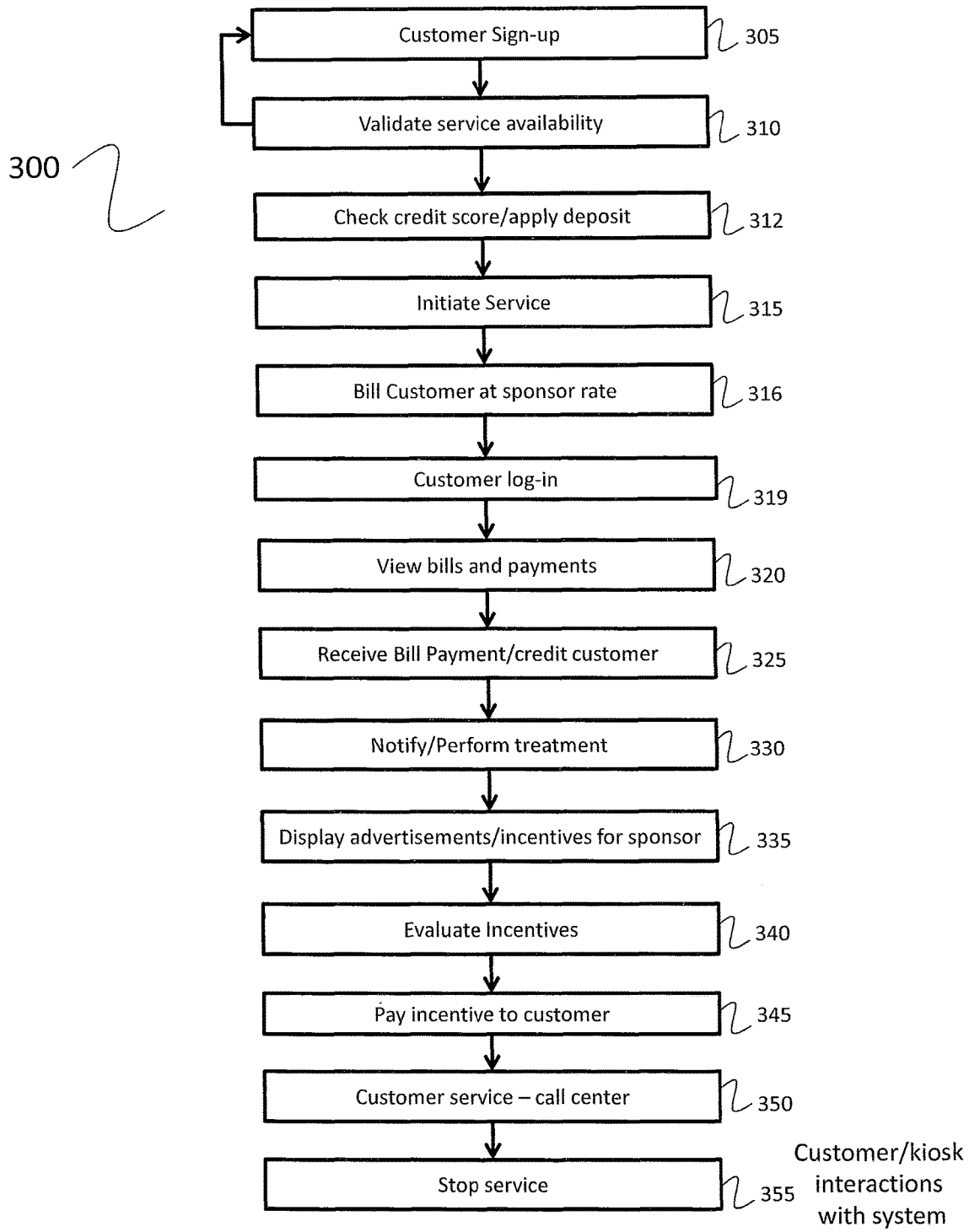
FIG. 3 is a flow chart of a preferred embodiment of a method for customer/remote display device interactions.

Referring to FIG. 3, a preferred method 300 of remote display device interaction with a customer is disclosed. The method is implemented by the interaction between the remote display device and the server to operate the remote display device application, the accounting engine and the ESI ID lookup engine.

At step 305, the remote display device displays a "sign-up" screen which shows a series of dialog boxes for receiving information from the customer to open an energy account to receive energy services. In a preferred embodiment, at step 305, a customer profile is requested from the new customer, generated by the remote display device application and stored in the set of customer data records. The customer profile includes log-in credentials and demographic information useful to the sponsor for creating advertisements and incentives.

The energy provider can only service customers in a geographic region served by the EMO, so the customer preferably maintains an address in the geographic region. At step 310, the remote display device receives a new customer address and requests an ESI ID lookup from the ESI ID lookup engine to validate service available. The ESI ID lookup engine determines the ESI ID for the customer address and then determines if the ESI ID is served by the EMO. If the ESI ID is not served by the EMO, then the method 300 returns to step 305.

At step 312, the remote display device receives sufficient information from the customer to validate a credit score. The credit score is determined. If the credit score is lower than a predefined threshold, the remote display device can apply an initial service deposit, and request immediate payment through the bank card processor of the remote display device.

At step 315, energy services are initiated for the customer at a pre-defined rate for the sponsor. Also, at step 316, customer is switched to the energy provider and energy is periodically invoiced from the EMO and periodically billed to the customer through the energy provider.

At step 319, the customer logs-in to a remote display device by presenting authorization credentials established in step 305. Also, the customer profile can be further updated at log-in.

At step 320, the remote display device responds to a request from the customer to view bill history, view payment history and view latest bill information.

At step 325, the remote display device responds to a request from the customer to receive a bill payment. The remote display device receives the bill payment through one of a set of methods including receiving a bank card in the bank card processor of the remote display device, receiving a credit card in the credit card processor of the remote display device, charging a predefined bank/credit card established in the database for the customer, charging a PayPal account established for the customer. The payment is accounted for by the account server and logged into the database.

At step 330, the remote display device application notifies the customer, on the display, of a treatment condition. The accounting engine ages each customer account on a continuous basis, applying treatment rules and scheduling treatment actions by the server. Treatment actions include communications to the customer through the remote display device display, through email messages, text messages and mailed letters. For example, when the customer is delinquent on a bill payment, the remote display device presents a message on the display explaining the possible actions to be taken or that have already been taken and an explanation of options for the customer, including, but not limited to immediate payment through the remote display device and communication of a telephone number for the call center so that the customer may call regarding the treatment condition.

At step 335, the remote display device displays sponsor advertisements and incentives while the customer is interacting with the remote display device. The remote display device provides the customer an opportunity to respond to immediate incentives.

At step 340, the remote display device application continuously evaluates customer incentive conditions and stores customer incentive awards in the database. When a customer interacts with the remote display device, the remote display device application notifies the customer, on the display, of an incentive condition and an incentive reward. In a preferred embodiment, the incentive condition and incentive reward can be related to the energy usage history, the payment history, a number of kiosk visits and the customer profile. The incentive can also be related to the sponsor, such as an in store discount or coupon.

At step 345, the customer is given an opportunity to receive the incentive reward. For example, at step 340, the kiosk generates and prints a coupon or a gift card for the customer. In a preferred embodiment, the coupon includes a pre-determined time limit that encourages the customer to make an immediate purchase while in the sponsor's retail location.

At step 350, the customer is given an opportunity to interact via text ("chat") with an online service agent at the call center using the display and the keyboard of the remote display device. The online service agent is connected from a console at the call center to the remote display device through the network. The "chat" service allows a customer to resolve billing questions, payment questions, treatment questions and incentive questions.

At step 355, the customer can cancel services with the energy provider and pay a final bill through the remote display device.

Figure 4:
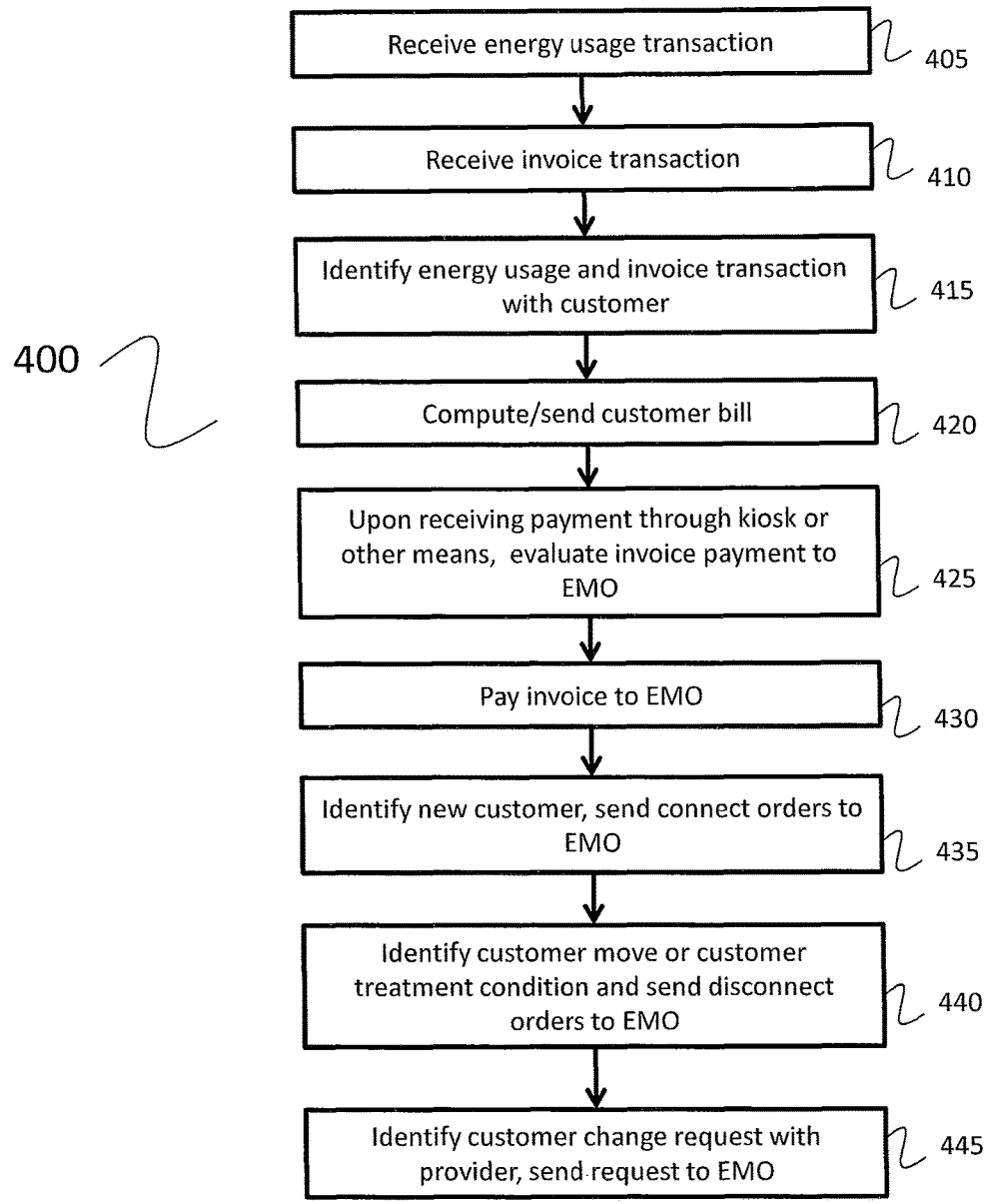
FIG. 4 is a flow chart of a preferred embodiment of a method facilitating energy transactions between an energy provider and an EMO.

Referring to FIG. 4, a method 400 for servicing interactions between the energy provider and the EMO are described. At step 405, the server receives an energy usage transaction from the EMO for an energy customer, processes the energy usage transaction and stores a record of the energy usage transaction in the database. At step 410, the server receives an invoice transaction from the EMO for an energy customer, processes the invoice transaction and stores a record of the invoice transaction in the database. At step 415, an energy usage transaction and an invoice transaction is matched for a customer in order to prepare a customer bill. At step 420, a customer bill is computed and sent to a customer based on matching in step 415. In sending a bill to a customer the server schedules an email of an electronic bill and/or schedules a paper letter to be sent to the customer. In computing the bill, the accounting engine ages the customer account by examining customer billing and payment history previously stored in the database.

At step 425, a payment is received from a remote display device for a customer for which an invoice transaction and energy usage transaction are matched. An invoice amount to the EMO is determined for from the customer payment and the invoice match. At step 430, a payment is made to the EMO based on the invoice amount.

At step 435, a new customer is identified through the remote display device for which a service connect order is generated by the server and sent to the EMO.

At step 440, a customer move or treatment condition is identified through the remote display device for which a service move or a service disconnect, respectively, is generate by the server and sent to the EMO.

At step 445, a customer change request is identified through the remote display device, in which a customer chooses to stop service with the energy provider and sponsor. The customer change request is communicated to the EMO.

Figure 5:
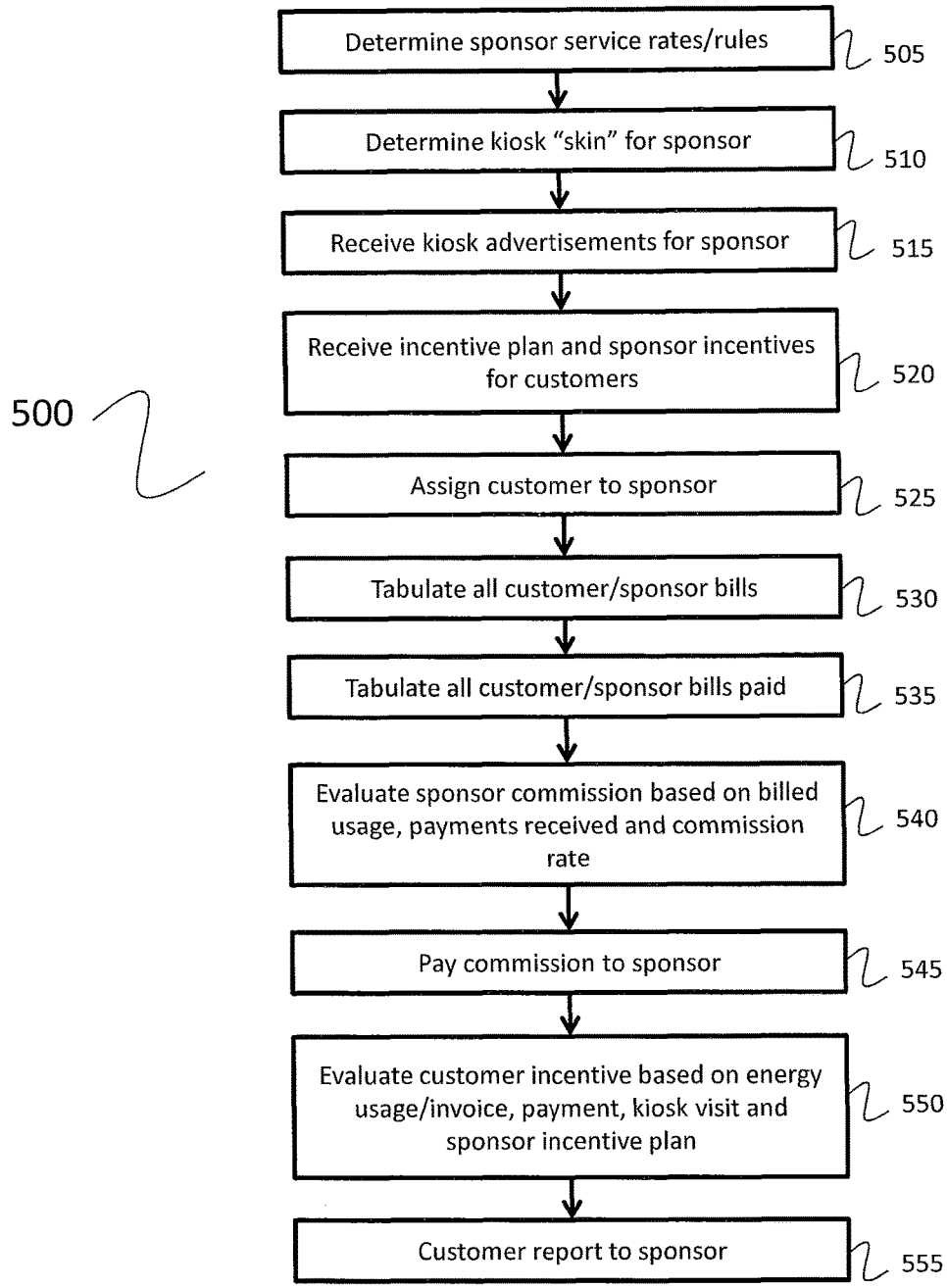
FIG. 5 is a flow chart of a preferred embodiment of a method facilitating energy transactions between an energy provider and a sponsor.

Referring to FIG. 5, a method 500 for servicing interactions between the energy provider and the sponsor are described. At step 505, a set of billing rates for energy usage and rules for determining billing rates for energy customers are determined for the sponsor. Also, a commission rate and a set of commission rules for the sponsor is determined. The commission rate establishes how to divide customer payments between the invoice amount from the energy market operator, the sponsor commission and the energy provider payment for services.

At step 510, a "skin" is designed for the remote display device application by receiving input from the sponsor. "Skin" attributes include, for example, kiosk display pages, menus and menu behavior. The skin attributes can also include, branding of the sponsor so that the sponsor appears as the energy provider to the customer. The "skin" attributes are selected using the sponsor application where graphics and text are uploaded for the remote display device.

At step 515, advertisements are received for display on the remote display device display. The advertisements can be dynamically uploaded by the sponsor to the sponsor application on a continuous basis.

At step 520, an incentive plan and a set of sponsor incentives are received for the remote display device application from the sponsor. The incentive plan includes a schedule and a set of rules for applying the set of sponsor incentives to customers.

At step 525, as a customer interacts with the remote display device to "sign-up", the customer is identified with the sponsor in the database in order to compute commissions for the sponsor and deliver incentives to the customer.

At step 530, for all customers identified with the sponsor, a set of customer bills are tabulated. At step 535, a set of customer payments received are tabulated. At step 540, a sponsor commission is determined based on the tabulation of the set of customer bills, the tabulation of the set of customer payments and the commission rate. In a preferred embodiment, commission is also determined based on the set of commission rules.

At step 545, the sponsor is paid the commission. In a preferred embodiment, the commission includes direct payment to the sponsor, credits toward advertising, and paid incentives to customers on behalf of the sponsor, for example, credits on the customer's energy bill based on energy usage, retail purchase history with sponsor, and so forth.

At step 550, customer incentives are evaluated for all customers identified with the sponsor. Each customer incentive is determined based the sponsor incentive plan and the set of incentives along with at least one of the customer attributes including the set of incentives, the customer's energy usage history, the customer's payment history and a number of kiosk visits. The list of customer attributes is provided by way of example. Other customer attributes can be defined in the sponsor incentive plan.

At step 555, the server generates a report of sponsored activity based on information in the database created by the remote display device application and the sponsor application. In a preferred embodiment, the report includes the tabulation of the set of customer bills, the tabulation of the set of customer payments, a tabulation of the commission, a number of customer visits per remote display device, statistics of call center usage through the remote display devices and statistics of kiosk visit information including an average interaction time per remote display device and statistics of interaction with the advertisements and incentives through the remote display device, such as a number of click-through events and a number of incentive rewards processed.

Figure 6:
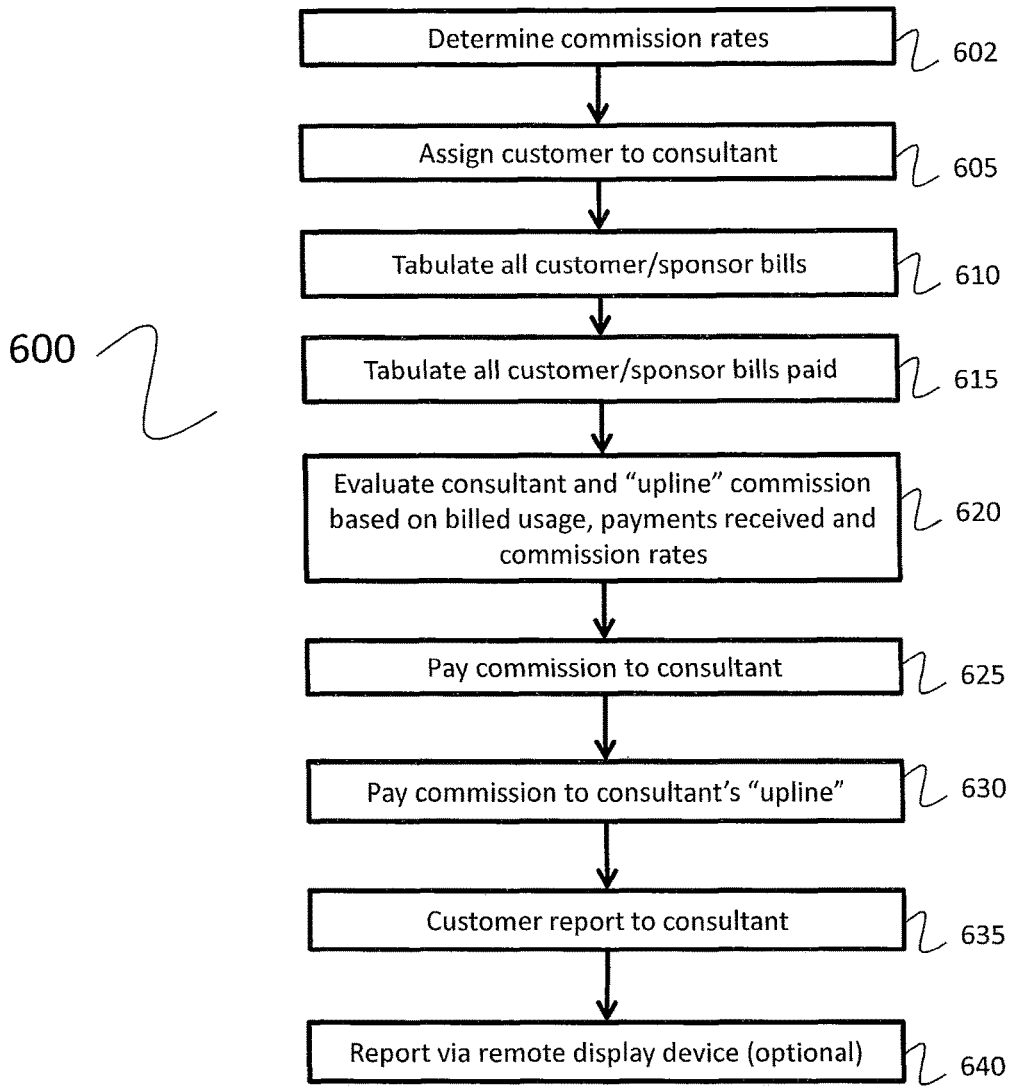
FIG. 6 is a flow chart of a preferred embodiment of a method facilitating energy transactions between an energy provider and a consultant.

Referring to FIG. 6, a method 600 for servicing interactions between the energy provider and the consultant are described. At step 602, the commission rate rules and commission rates are determined which establishes how to divide customer payments between the energy market operator, a consultant, the consultant's "upline," the sponsor and the energy provider. An "upline" is a multiple level sales reporting and commissions structure. Participants receive a commission based on the sales of other related participants as determined in the commission rate rules.

At step 605, the consultant is assigned to a set of energy customers.

At step 610, for the set of customers assigned to the consultant, a set of customer bills are tabulated, and at step 615, a set of customer payments received are tabulated. At step 620, a consultant commission is determined based on the tabulation of the set of customer bills, the tabulation of the set of customer payments and the commission rate.

At step 625, the consultant is paid the consultant's commission. At step 630, the related participants are paid.

At step 635, the server generates a customer report for the set of customers. In a preferred embodiment, the report includes the tabulation of the set of customer bills, the tabulation of the set of customer payments and a tabulation of the commissions paid. The report may also include a number of customer visits per remote display device and statistics of call center usage through the remote display devices.

At step 640, the consultant can optionally receive and print the customer report at a remote display device. The remote display device application includes a set of programmed instructions to receive customer reports from the server, format the customer reports for the remote display device, and transmit the customer reports to the remote display device.

While the present invention has been described in terms of specific embodiments thereof, it will be understood in view of the present disclosure, that numerous variations upon the invention are now enabled to those skilled in the art, which variations yet reside within the scope of the present teaching. For example, in an alternate embodiment the kiosk can be configured to display energy provider advertisements and provide energy provider incentives along with or instead of the sponsor advertisements and incentives. Accordingly, the invention is to be broadly construed, and limited only by the scope and spirit of the claims now appended hereto.

The invention claimed is:

1. A system for sponsoring energy services from an energy provider at a remote display device comprising:
    a server comprising a first memory and a first processor;
    the remote display device configured as a kiosk, in communication with the server, and comprising a second memory, a second processor, a display, and a printer;
    the first memory of the server comprising instructions that when executed by the first processor of the server cause the server to perform operations comprising:
        receiving, by the server, a set of sponsor information, the set of sponsor information comprising the sponsor commission rate and sponsor commission rules that establish how to divide payments from the energy customer between an invoice amount from an energy market operator, a sponsor commission, and an energy provider payment for services;
        receiving, by the server, a set of energy usage information related to the energy customer;
        determining, by the server, at least a portion of the set of sponsor information to send to the remote display device;
        sending, by the server, the set of energy usage information to the remote display device;
        receiving, by the server, a set of payment information from the remote display device;
        determining, by the server, the sponsor commission based on the set of energy usage information, the set of payment information, a tabulation of a set of energy customer bills, a tabulation of a set of energy customer payments, and a sponsor commission rate, the sponsor commission including a direct payment to the sponsor, a credit toward advertising, and a first incentive provided to the energy customer on behalf of the sponsor;
        accounting, by the server, the first incentive to the energy customer as a credit on a bill of the energy customer based on the energy usage information and a retail purchase history by the energy customer with the sponsor;
        sending, by the server, a second incentive to the energy customer via the remote display device, wherein the second incentive comprises a coupon with a predetermined time limit to make a purchase while in a retail location of a sponsor where the remote display device is located;
        associating the second incentive sent to the energy customer to an energy usage history of the energy customer, a payment history of the energy customer, a number of kiosk visits of the energy customer, and a customer profile of the energy customer;
        interacting with the second processor at the remote display device to associate the energy customer with the sponsor in a database to compute the sponsor commission;

the second memory of the remote display device comprising instructions that when executed by the second processor, cause the remote display device to perform the operations of:
 sending a payment request including the set of payment information;
 receiving a payment confirmation; and
 printing out the coupon using the printer.

2. The system of claim 1 wherein the set of sponsor information includes an advertisement that is displayed on the kiosk.

3. The system of claim 1 wherein the remote display device further comprises a handheld communication device and wherein the set of energy usage information is displayed on the handheld communication device.

4. The system of claim 3 wherein the set of energy usage information includes a usage transaction and an invoice transaction.

5. The system of claim 4 wherein execution of the instructions in the first memory by the processor of the server further causes the server to perform the operation of:
 matching, by the server, the usage transaction and the invoice transaction.

6. The system of claim 1 wherein execution of the instructions in the first memory by the processor of the server further causes the server to perform the operations of:
 receiving, by the server, an energy customer address;
 determining, by the server, a meter identifier for an energy meter at the energy customer address; and,
 determining, by the server, if the energy customer address is within an authorized geographic territory.

7. The system of claim 1 further comprising,
 a call center; and
 wherein execution of the instructions in the first memory by the processor of the server further causes the server to perform the operation of connecting the remote display device to the call center.

8. The system of claim 7, wherein execution of the instructions in the first memory by the processor of the server further causes the server to perform the operation of:
 enabling transmission of a content communication between the remote display device and the energy provider.

9. The system of claim 8 wherein the content communication is a written message.

10. The system of claim 1 wherein the set of sponsor information includes at least one of the group of: branding information, incentive information and advertising information.

11. The system of claim 1, wherein the second incentive is related to the sponsor.

12. The system of claim 1, wherein execution of the instructions in the second memory by the second processor of the remote display device further causes the remote display device to perform the operation of:
 receiving a payment.

13. A system for facilitating energy services for an energy provider at a remote display kiosk, comprising:
 a server, having a first memory and a first processor;
 the remote display kiosk, having a second memory, a second processor, a display, and a printer, in communication with the server;
 the first memory of the server comprising instructions that when executed by the first processor of the server cause the server to perform operations comprising:
  receiving a set of sponsor information comprising the sponsor commission rate and sponsor commission rules that establish how to divide payments from the energy customer between an invoice amount from an energy market operator, a sponsor commission, and an energy provider payment for services;
  receiving a set of energy usage information related to the energy customer;
  determining at least a portion of the set of sponsor information to send to the remote display kiosk;
  sending the set of energy usage information to the remote display kiosk;
  sending the portion of the set of sponsor information to the remote display kiosk;
  receiving a set of payment information from the remote display kiosk;
  determining the sponsor commission based on the set of energy usage information, the set of payment information, a tabulation of a set of energy customer bills, a tabulation of a set of energy customer payments, and a sponsor commission rate, the sponsor commission including a direct payment to the sponsor, a credit toward advertising, and a first incentive provided to the energy customer on behalf of the sponsor;
  accounting for the first incentive to the energy customer as a credit on a bill of the energy customer based on the energy usage information and a retail purchase history by the energy customer with the sponsor;
  sending a second incentive to the energy customer via the remote display kiosk, wherein the second incentive comprises a coupon with a pre-determined time limit to make a purchase while in a retail location of a sponsor where the remote display kiosk is located;
  wherein the second incentive sent to the energy customer is based on an energy usage history of the energy customer, a payment history of the energy customer, a number of kiosk visits of the energy customer, and a customer profile of the energy customer;
  interacting with the second processor at the remote display kiosk to associate the energy customer with the sponsor in a database to compute the sponsor commission;
 the second memory of the remote display kiosk comprising instructions that when executed by the second processor, cause the remote display kiosk to perform the operations of:
  sending a payment request including the set of payment information;
  receiving a payment confirmation; and
  printing out the coupon using the printer.

\* \* \* \* \*